(12) United States Patent
Williams et al.

(10) Patent No.: US 7,921,351 B2
(45) Date of Patent: Apr. 5, 2011

(54) INCREASING ERROR CORRECTION IN DATA STREAMS ENCODED WITH LINEAR BLOCK CODE

(75) Inventors: Thomas H. Williams, Longmont, CO (US); Luis Alberto Campos, Superior, CO (US)

(73) Assignee: Cable Television Labs, Inc., Louisville, CO (US)

(*) Notice: Subject to any disclaimer, the term of this patent is extended or adjusted under 35 U.S.C. 154(b) by 1042 days.

(21) Appl. No.: 11/679,246

(22) Filed: Feb. 27, 2007

(65) Prior Publication Data
US 2008/0155376 A1 Jun. 26, 2008

Related U.S. Application Data

(60) Provisional application No. 60/871,757, filed on Dec. 22, 2006.

(51) Int. Cl.
*H03M 13/00* (2006.01)
(52) U.S. Cl. ........................ 714/784; 714/760
(58) Field of Classification Search ............. 714/760, 714/784
See application file for complete search history.

(56) References Cited

U.S. PATENT DOCUMENTS

| | | | |
|---|---|---|---|
| 5,875,199 A | 2/1999 | Luthi | |
| 6,446,236 B1* | 9/2002 | McEwen et al. | 714/795 |
| 2004/0240529 A1* | 12/2004 | Leonard et al. | 375/148 |

OTHER PUBLICATIONS

"Digital Communications, Fundamentals and Applications," Bernard Sklar, The Aerospace Corporation, El Segundo, California, and University of California, Los Angeles, Section 5.5.5, P T R Prentice Hall 1988.

* cited by examiner

*Primary Examiner* — Guy J Lamarre
(74) *Attorney, Agent, or Firm* — William W. Cochran; Cochran Freund & Young LLC

(57) ABSTRACT

Disclosed is an apparatus and method for increasing the error correction capabilities of a receiver circuit that receives a data stream of encoded data symbols that are encoded with a linear block code. Analog and digital comparator circuits are used to detect laser clipping or analog to digital converter overloading. Corrupted symbols are detected by comparing in-phase and/or quadrature phase baseband signals with pre-determined threshold limits that indicate that the in-phase and quadrature phase signals have exceeded the normal signal trajectory of an unimpaired signal. Corrupted symbols may also be detected by determining that the laser has been clipped. Corrupted symbols are marked for erasure prior to decoding and error correction. Erasure of corrupted signals increases the error correction capabilities of the decoder circuit.

13 Claims, 8 Drawing Sheets

INCREASING ERROR CORRECTION IN DATA STREAMS ENCODED WITH LINEAR BLOCK CODE

CROSS-REFERENCE TO RELATED APPLICATION

This application is based upon and claims priority to U.S. provisional application Ser. No. 60/871,757, filed Dec. 22, 2006, entitled "Increasing Error Correction in Data Streams Encoded With Linear Block Code," the entire disclosure of which is herein specifically incorporated by reference for all that it discloses and teaches.

BACKGROUND OF THE INVENTION

In an effort to deploy high speed services in two way hybrid fiber coaxial cable systems, the performance of the return (upstream) path has become an important issue. Burst noise on the upstream path is a common impairment. The tree and branch architecture utilized on the down stream cable transmissions works well by splitting and replicating the signal from the headend at multiple points. However, in the upstream cable signal path, the cable architecture, which is linear, combines noise from many sources that are located in a plurality of homes and businesses and reduces the signal to noise ratio. In the sub-split band 5-42 MHz, man-made noise is prevalent, particularly in the 5-15 MHz portion where sources of interference may include noise from coaxial cable shield breaks, radio frequency interference generated by transmitters and household appliances, etc. Also, impairments are aggravated by the lack of continuous calibrated signal sources from the remote points. The forward path uses the output of the headend as a reference signal for gain, frequency response, and noise, but the return upstream path has no such reference. This contributes to frequent alignment problems. Furthermore, there is difficulty in determining the entry point of ingress into the return cable plant. This is especially difficult when the noise is burst noise, of a short duration, or of a transient nature. Burst noise also affects wireless systems, both upstream and downstream.

SUMMARY OF THE INVENTION

An embodiment of the present invention may therefore comprise a receiver that receives a data stream of modulated data symbols that have been encoded with a linear block code comprising: a comparator that receives the data stream and that compares the data symbols with at least one predetermined limit that is capable of indicating in-band impairment and out-of-band impairment of the data symbols to identify corrupt data symbols in the data stream as the data symbols are received by the receiver; an output control signal generated by the circuit that marks the corrupt data symbols in the data stream; and a decoder that is connected to the circuit to receive the output control signal and erase the corrupt data symbols that are marked by the output control signal prior to performing error corrections so as to increase error correction capabilities of the decoder.

An embodiment of the present invention may further comprise a communication system for transmitting and receiving a stream of data comprising: an encoder that encodes the stream of data into data symbols using a linear block code; a clipping detector that compares the data symbols with at least one predetermined limit that is capable of detecting in-band impairment and out-of-band impairment of the data symbols to identify corrupt data symbols, and that marks the corrupted received data symbols; a decoder that erases the corrupted data symbols prior to performing error correction to increase correction capabilities of said decoder.

An embodiment of the present invention may further comprise a receiver for receiving a data stream of data symbols that have been encoded with a linear block code comprising: a complex demodulator that demodulates the data symbols to produce an in-phase component and a quadrature phase component; detectors that detect if the in-phase component or the quadrature phase component exceed predetermined thresholds that indicate in-band impairment of the data symbols and generate control signals that identify data symbols for erasure selected from the group consisting of data symbols that have: in-phase components that exceed the predetermined thresholds, and quadrature phase components that exceed the predetermined thresholds; a decoder that erases the data symbols that have been identified by the control signals prior to decoding by the decoder to increase data correction capabilities of the decoder.

An embodiment of the present invention may further comprise a method of increasing error correction capabilities of a decoder that decodes and corrects linear block encoded symbols comprising: transmitting the linear block encoded symbols through an optical transmission line using lasers; comparing the linear block encoded symbols with at least one predetermined limit to identify corrupt data symbols in the data stream, said limit corresponding to at least one of the group consisting of: a saturation limit of the lasers and a threshold limit of the lasers; generating a control signal that marks the corrupt data symbols; erasing the corrupt data symbols that have been marked by the control signal; decoding the data stream after the corrupt data symbols have been erased from the data stream to increase the error correction capabilities of the decoder.

An embodiment of the present invention may further comprise a method of increasing error correction capabilities of a receiver that receives a data stream of data symbols that have been encoded with a linear block code comprising: demodulating the data stream of the data symbols such that the data symbols have an in-phase component and a quadrature phase component; detecting if the in-phase component exceeds in-phase limits that indicate an in-band impairment of the in-phase component; detecting if the quadrature phase component exceeds quadrature phase limits that indicate in-band impairment of the quadrature phase component; generating a control signal that identifies corrupt data symbols for erasure that have an in-phase component that exceeds the in-phase limits or a quadrature phase component that exceeds the quadrature phase limits; erasing the corrupt data symbols that have been identified by the control signal; decoding the data symbols after the corrupt data symbols that have been identified by the control signal have been erased, so as to increase data correction capabilities of the receiver.

DETAILED DESCRIPTION OF THE PREFERRED EMBODIMENT

Figure 1:
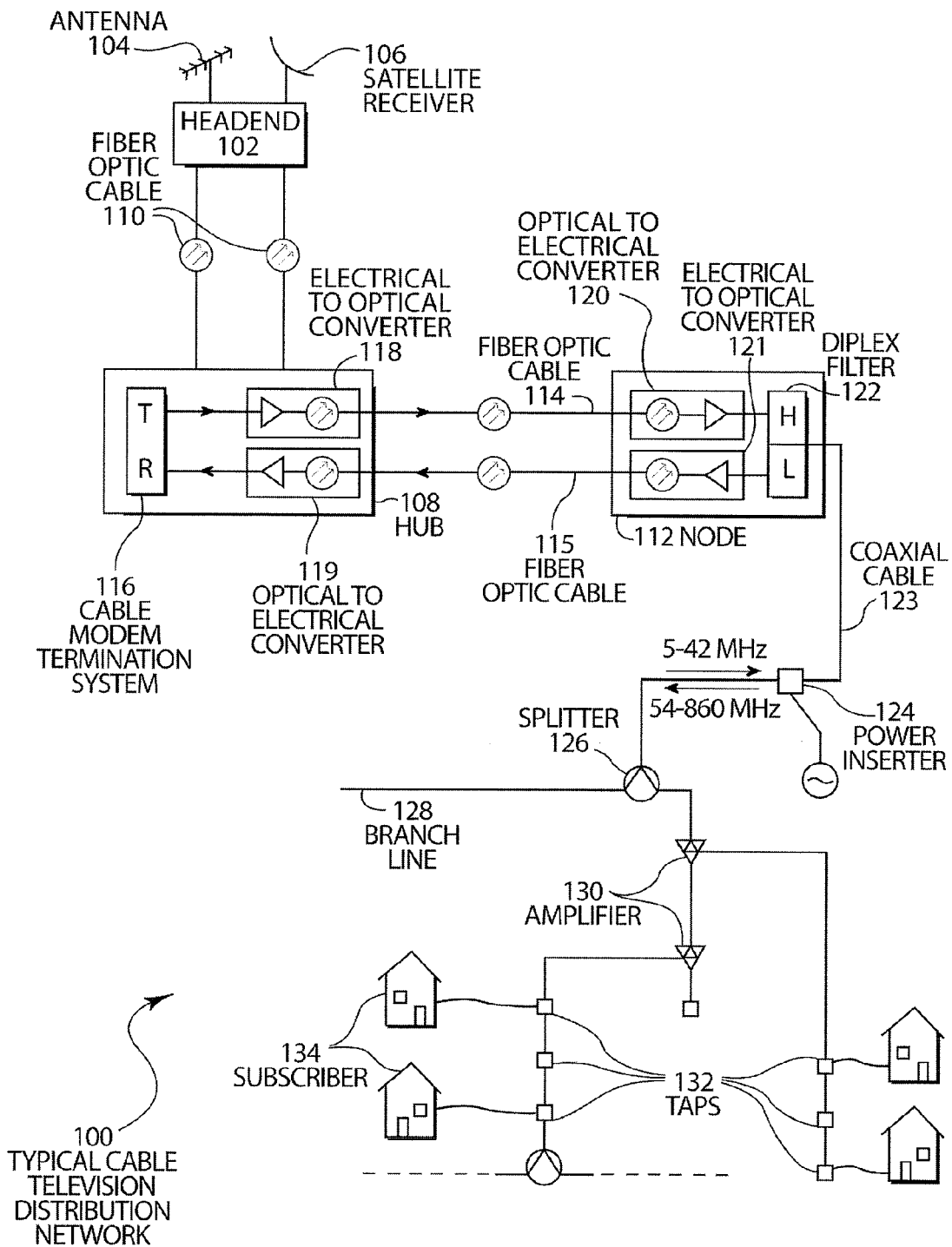
FIG. 1 is an illustration of architecture of a cable television distribution network.

High speed data services are normally delivered over devices conforming to the DOCSIS® specification of Cable Television Laboratories, Inc. In the headend or hub site is a device called the Cable Modem Termination System (CMTS) and downstream in the home/business is a device called the Cable Modem (CM). The CM acts as a host for an Internet Protocol (IP) device, typically a personal computer (PC). Of course, any IP communication device can be used in place of a PC. For explanatory purposes, the disclosure has indicated the IP device as a "computer." Transmissions from the CMTS to the CM are carried over the downstream portion of the cable plant, which may be 54 to 860 MHz. Downstream digital transmissions are continuous and are monitored by many CMs. Upstream transmissions from the CMs to the CMTS are typically carried in the 5-42 MHz frequency band. European networks and other networks may have a different split in frequencies. Upstream bandwidth is shared by the population of CMs that is on-line. Transmission opportunities are granted by the CMTS to the CM on an as-needed basis.

In an effort to deploy high speed services in two way hybrid fiber coaxial cable systems, the performance of the return (upstream) cable system has become an important issue. Most cable impairments come from the coaxial portion of the cable plant. While the downstream cable plant is relatively free of severe impairments, the upstream plant is afflicted with a variety of impairments. This is because the coaxial cable plant is a linear system that uses a tree and branch architecture. The downstream signals are split giving many copies of a good signal. The upstream signals are combined, giving any noise source in any home an opportunity to create interference for the transmissions from all homes, which are additive because the cable plant is a combining system. This effect is called "noise-funneling". Upstream cable impairments are most severe in the 5-15 MHz portion of the 5-42 MHz return band. Shield breaks in the coaxial cable, particularly inside homes, give many noise sources an opportunity to ingress into the upstream signal path. The sources of interference may include broadcast signals, such as radio stations, citizen band radios, and ham radios. Short duration interferences may include lightning, static electricity discharges, and interference from the AC power grid. Interference associated with the power grid is the worst, and the interference is commonly referred to as "burst noise." The interference may be created by switching or operating loads, such as fish tank heaters, appliances with motors using brushes, or lighting.

Another cable impairment is called common path distortion (CPD). This impairment is created by downstream signals in the 54-860 MHz band mixing in non-linear diodes and creating distortion in the upstream frequency band. The diodes are in the common path between upstream and downstream signals and are created by corrosion. Also, impairments may be made worse by the lack of continuous calibrated signal sources from the remote points. The forward path uses output of the headend as a reference signal for gain, frequency response, and noise, but the return upstream path has no such continuously-on reference. This contributes to frequent alignment problems. Furthermore, there is difficulty in determining the entry point of ingress into the return cable plant. This is especially difficult when the noise is of a short duration, or of a transient nature, such as burst noise.

Although the fiber optic portion of the upstream path is relatively immune to impairments, there is one weak element, the solid state laser. If the burst noise, which is typically located in the 5-15 MHz portion of the band is strong enough, it can temporarily extinguish the laser. This means that the laser stops producing coherent light, and transmissions in all frequency bands, even bands outside the 5-15 MHz band are affected.

The DOCSIS specification has a remedy for upstream impairments, i.e., forward error correcting codes (FEC) using Reed-Solomon linear block codes. FEC is combined with interleaving so that the effect of a long burst will be spread over many blocks, allowing successful error correction on all blocks. However, if the burst noise is too severe, the FEC will not be sufficient to correct all of the corrupt RS symbols in a block of data and the block transmissions will fail.

FIG. 1 schematically illustrates the architecture of a cable television distribution network 100. The headend 102 is the source for the various television signals. Various antennas 104 and satellite antenna or dish 106 may receive television signals and be converted as necessary and transmitted over fiber optic cables 110 to a hub 108. Several hubs may be connected to a single headend 102.

The hub 108 may be connected to several nodes, such as node 112 by fiber optic cable 114. In general, the fiber optic cables 114 and 115 may have several glass fibers dedicated to downstream transmission and several glass fibers dedicated to upstream transmission. There may be more or fewer glass fibers transmitting downstream than upstream, as conditions dictate.

The communication path for a cable modem in the cable television network contains the cable modem termination system 116 (CMTS) that connects the local cable modem network to the Internet backbone. The CMTS may exist in a headend 102 or a hub 108 depending on the design of the network.

The CMTS 116 connects to a downstream path through an electrical to optical converter 118 that is connected to the fiber optic cable 114, which in turn, is connected to an optical to electrical converter 120 at node 112. The signal is transmitted to a diplex filter 122 that combines the upstream and downstream signals onto a single cable. The diplex filter allows the different frequency bands to be combined onto the same cable and also separated. The downstream channel width in the United States is generally 6 megahertz. In a modern United States cable distribution system, the downstream signals may be 54 to 860 MHz and the upstream signals may be between 5 and 42 MHz.

After the downstream signal leaves the node 112, the signal is typically carried by coaxial cable 123. At various stages, a power inserter 124 may be used to power the coaxial line equipment, such as amplifiers or other equipment. The signal may be split with a splitter 126 to a branch line 128. Further, at various locations, bi-directional amplifiers 130 may boost the signal. Bi-directional amplifiers 130 may also split the signal. Taps 132 along the branches provide connections to subscriber's homes 134. Although the configuration of FIG. 1 illustrates one architecture of a cable television distribution network, different architectures are also used.

Upstream transmissions from subscribers to the hub or headend occur by passing through the same coaxial cable as the downstream signals, in the opposite direction on a different frequency band. The upstream signals are sent typically utilizing 16-QAM or QPSK with Reed-Solomon forward error correction code enabled. The upstream signals can also constitute 8-QAM, 32-QAM, 64-QAM, 128-QAM that are not used as frequently as the 16-QAM or QPSK modulation. Encodings such as S-CDMA modulation (synchronous code division multiple access modulation) can also be used. Of course, any type of modulation technique or encoding technique can be used, as desired. Transmissions are sent in a frequency/time division multiplexing access (FDMA/TDMA) scheme, as specified in the DOCSIS standards of Cable Television Laboratories, Inc. Diplex filter 122 splits the low frequency signals from the high frequency signals so that the low frequency, upstream signals can be applied to the electrical to optical converter 121 in the upstream path. Electrical to optical converter 121 converts the upstream electrical signals to light waves which are sent through fiber optic cable 115 and received by optical to electrical converter 119.

The network 100 may have different downstream and upstream characteristics. The signals that originate at the headend 102 are divided and split at various locations while generally keeping the signals intact. As such, there is one source for signals and many receivers. For upstream communication, such as with cable modems or other remote transmitters, there are many sources for signals that are combined into a single signal. As disclosed above, the 'funnel effect' of the plurality of noise generating locations makes for drastically increased noise on the upstream path as compared to the downstream path. Further, older networks have been designed primarily for downstream performance. As such, the older networks may have poor upstream performance.

Various networks may have significantly different performance characteristics. Many factors contribute to the performance effects, including cable length and quality and the number of connectors and components distributed along the path. Further, environmental factors, such as burst noise, changes on the power grid, lightning, ingressing external RF noise, and other factors may degrade the performance of the network.

Figure 2:
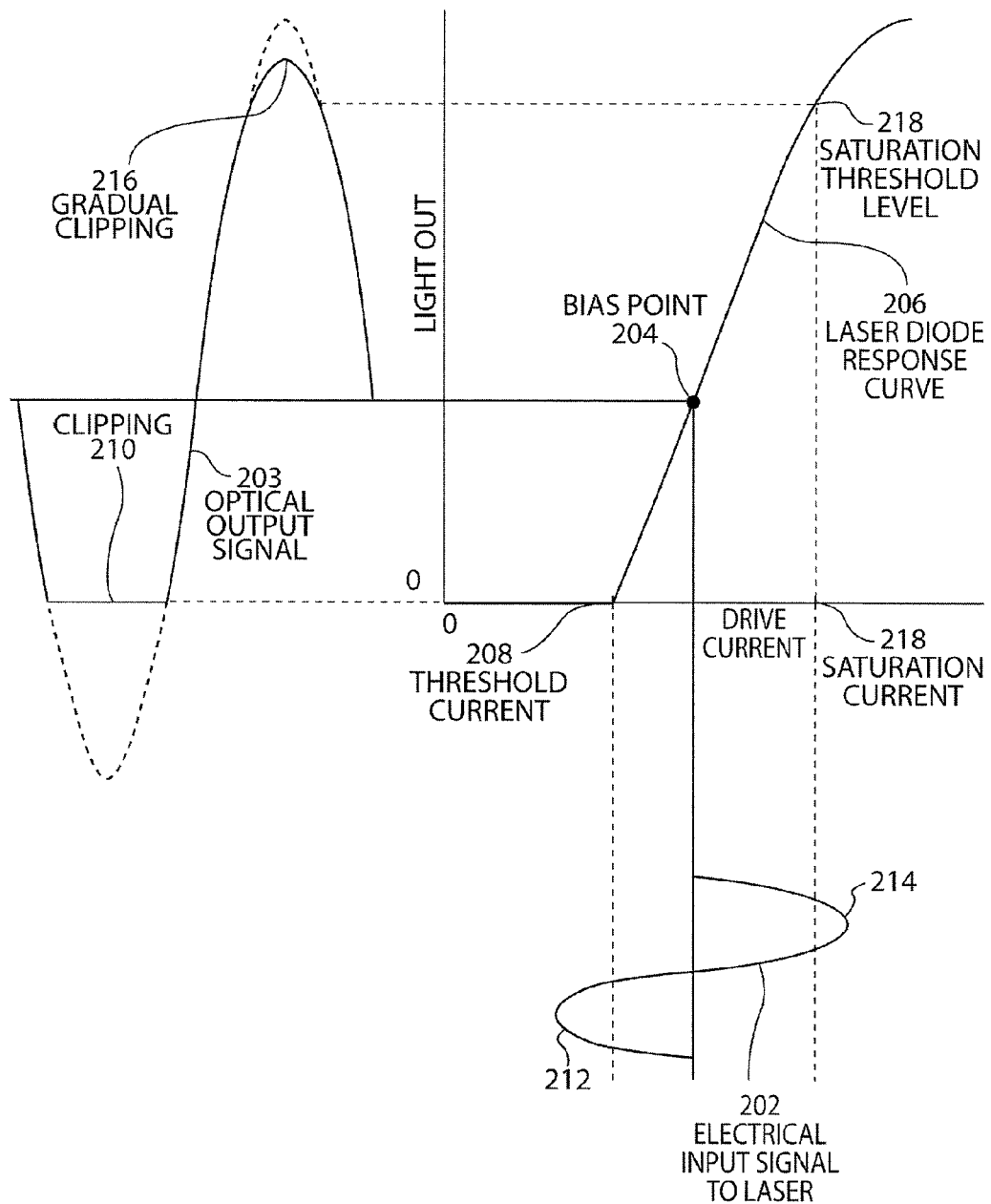
FIG. 2 is an illustration of the light output of a laser diode used in the network of FIG. 1 versus the diode drive current.

Fiber optic cables are typically driven by laser diodes. Laser diodes types include Fabry Perot and DFB (distributed feedback) laser diodes. Analog video transmission laser diodes are selected for low distortion. As shown in FIG. 2, an electrical input signal 202 is an undistorted sine wave that is applied to the laser. The output optical signal 203 is the optical output from the laser, which is a distorted sine wave. Laser diodes begin to laser at a diode threshold current 208. Below the threshold current 208, for all practical purposes, the laser turns off (is extinguished) and abrupt clipping of any signal being carried by the laser occurs. At a saturation current 218, the diode reaches saturation and the light output of the laser diode becomes non-linear. Gradual clipping begins to occur at this point. The clipping that occurs both below the threshold current level and above the saturation current level introduces distortion into the optical signal. These upper and lower current limits 218, 208 for the laser diode saturation and threshold drive currents, respectively, can be used to detect errors in the transmitted signal due to laser clipping, which is used herein to describe the distortion introduced as a result of the laser either being extinguished or saturated. The input signal 202 is also illustrated in FIG. 2. The input signal 202 is biased at a bias point 204 on a laser diode response curve 206. As shown in FIG. 2, the input signal 202 has an input current that extends below the threshold current 208 and the output response is clipped, as shown by the clipping of light output 210. Normally, the input signal would extend to portion 212, but since the input signal 202 extends below the threshold current 208 as a result of the bias location of the point 204, the portion 212 of the input signal 202 does not drive the laser diode, since portion 212 falls below the threshold current. This results in clipping 210. As the input signal 202 extends in an upward direction, the input signal 202 is gradually clipped as shown at portion 216, since the portion 214 of the input signal extends beyond the saturation threshold level 218 on the laser diode response curve 206. The gradual saturation 216 is a result of the curvature of the laser diode response curve 206 after the diode current exceeds the saturation threshold level 218. As a result, the optical output response of the laser diode is extinguished below a lower threshold current and saturated above an upper saturation current, as shown in FIG. 2, both of which are referred to herein as clipping.

In addition to laser clipping, another source of upstream impairment is ingress or burst noise and broadcast noise. For instance, if a transmission is made at 30 MHz and the system receives a big burst of noise between 5 and 10 MHz, the laser output may be clipped. The burst noise at the lower frequencies can still cause the laser to create an impairment called cross-compression or cross-modulation. This impairment can be classified as a non-linear impairment caused by overloading. Non-linear distortions can be caused by overloaded amplifiers and clipped lasers.

Burst noise energy has been observed to be strong enough to frequently cause compression of the upstream active devices for a brief period of time. Most of the energy that causes the compression is in the 5-15 MHz band, but signals at all other frequencies are affected by cross-compression. The effect can be caused by cross-compression which is a third-order distortion and is similar to cross-modulation on the forward end plant. This phenomenon is especially noticeable on systems using Fabry-Perot lasers, which have limited dynamic range. Hence, many of the upstream impairments are actually caused by laser (or other) clipping where the energy causing the clipping is not in the same band as the affected carriers.

Cross-compression has also been observed because of set-top polling and ham radio transmissions. Cross-compression is a phenomenon that affects all frequencies. When all return frequencies are affected, modems that use frequency hopping will not find a low bit error rate frequency to occupy. One solution to these problems is to use Reed-Solomon forward error correction on upstream packets to protect the packets from burst noise transmission errors. Interleaving is used to insure that longer bursts of noise are disbursed over several codes, thereby preventing data loss. Reed-Solomon error correction is a linear forward error-correcting process that works by taking a block of data at the transmit site and adding extra redundant bits. At the receiver, if errors have occurred, the decoder attempts to correct the errors. Success depends on the strength of the Reed-Solomon code as well as the number of errors.

Figure 3A:
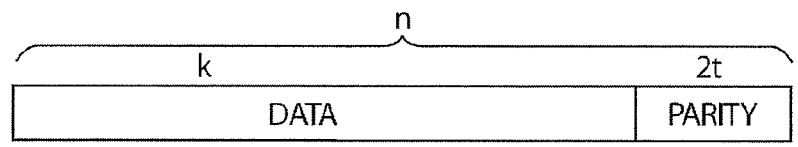
FIG. 3A illustrates a diagram of a typical Reed-Solomon (RS) code word.

The data points are sent as encoded blocks. Reed-Solomon is one form of linear block encoding. The signal that is transmitted in cable systems, and other systems, such as satellite transmission systems, is a composite signal of linear block encoded symbols, which are typically Reed-Solomon encoded symbols. The present invention may be employed with any type of linear block encoded symbols. A Reed-Solomon code is specified as RS(n,k). There are n-k parity RS symbols of s bits each. In DOCSIS s=8. A Reed-Solomon decoder can correct up to t RS (Reed Solomon) symbols that contain errors in a codeword, where 2t=n-k. FIG. 3A illustrates a diagram of a typical Reed-Solomon code word comprised of RS symbols. A popular Reed-Solomon code is RS(255,223) with 8-bit RS symbols. Each codeword contains 255 code word bytes, of which 223 bytes are data and 32 bytes are parity. The number k, k<n, of RS symbols in the block is a design parameter. The commonly used code encodes k=223 8-bit RS symbols plus 32 8-bit parity RS symbols in an n=255-RS symbol block; this is denoted as a (n, k)=(255,223) code, which is capable of correcting up to 16 RS symbol errors per block.

RS codes are a subset of BCH (Bose, Chaudhuri & Hocquenghem) codes and are commonly referred to as linear block codes. The codeword is comprised of k RS symbols that are encoded to form a longer n-RS symbol code word. The RS symbols are 8 bits each for the Reed-Solomon code used by DOCSIS. The n RS symbol code word consists of the original k RS symbols plus n–k parity RS symbols. The n–k parity RS symbols allow up to t erred RS symbols to be corrected, where 2*t=n–k. For the case of DOCSIS, n=255 and t may assume values between 0 and 16 RS symbols. If t=16, up to 16 RS symbols can be corrected. Thus, using a large value of t results in increased transmission overhead, but the benefit is increased robustness in the presence of impairments.

One of the properties of the RS error correcting code is that if the location of an erred RS symbol can be identified, then up to 2*t erred RS symbols can be corrected in a process called "erasure". Erasure thus provides the ability to correct twice as many erred RS symbols if you have some method to mark the RS symbols as erred and to be erased. Multiple ways to mark corrupted RS symbols for erasure are disclosed herein.

Reed-Solomon encoding and decoding is normally done in integrated circuits. Custom integrated circuits that perform RS encoding and decoding can be purchased, but current system design is more commonly done using a hardware design language, such a VHDL or Verilog. The finished design is compiled into a programmable logic device, or used to fabricate an application specific integrated circuit (ASIC) for high volume applications. Sometimes it is easier to purchase a design for a RS decoder from a company that sells the design as "cores". 4i2i Communications, Ltd. of Doig Scott Building, Craibstone Estate, Bucksburn, Aberdeen, AB21 9YA, Scotland, with a U.S. office at 2570 North First Street, Suite 440, San Jose, Calif., 95131; is one such company that sells a RS decoder core.

The error-correcting ability of any Reed-Solomon code is determined by n–k, the measure of redundancy in the block. If the locations of the erred RS symbols are not known in advance, then a Reed-Solomon code can correct up to t=(n–k)/2 erred RS symbols, i.e., it can correct half as many errors as there are redundant RS symbols added to the block. Sometimes error locations are known in advance, e.g., "side information" in demodulator signal-to-noise ratios. These are called erasures. A Reed-Solomon code is able to correct twice as many erasures as errors, and any combination of errors and erasures can be corrected as long as the inequality 2E+S≦(n–k) is satisfied, where E is the number of errors and S is the number of erasures in the block. The use of erasures can increase error correction capabilities when linear block codes are used other than Reed-Solomon codes.

Reed-Solomon algebraic decoding procedures can correct errors and erasures. An erasure occurs when the position of an erred RS symbol is known. A decoder can correct up to t errors or up to 2t erasures. Erasure information can sometimes be supplied by the demodulator in a digital communication system, i.e. the demodulator "flags" received data symbols that are likely to contain errors. When a codeword is decoded, there are three possible outcomes. If 2s+r<2t (s errors, r erasures) then the original transmitted code word will always be recovered. The decoder will detect that it cannot recover the original code word and indicate this fact, or the decoder will incorrectly decode and recover an incorrect code word without any indication. The probability of each of the three possibilities depends on the particular Reed-Solomon code and on the number and distribution of errors.

Figure 3B:
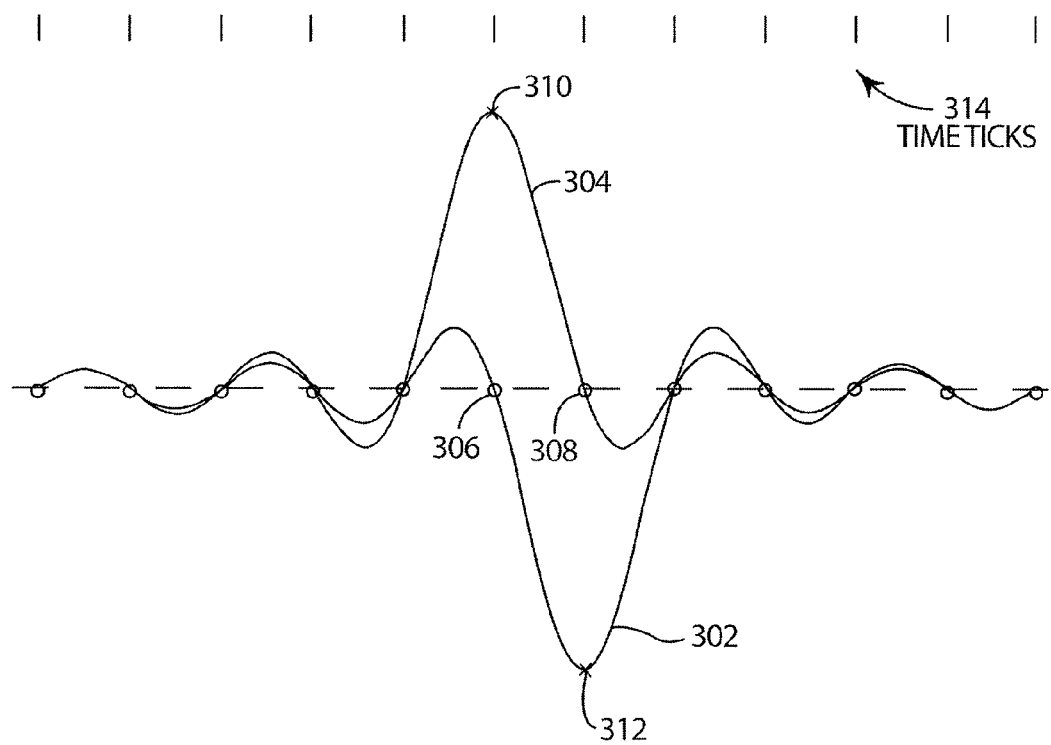
FIG. 3B illustrates an example of a stream of data symbols by showing the component parts of a combined signal.

FIG. 3B is a plot illustrating two data symbols. The horizontal axis is time and the vertical axis is voltage. The data symbol rate is noted by the data symbol clock 314 at the top of the diagram. Only two data symbols are illustrated. A composite signal is comprised of a first data symbol 304 and a second data symbol 302. Normally a new data symbol would occur at each time tick, and the overlapped plots could be considered to be an "eye" diagram. The first data symbol 304 has a value of +1 when sampled at point 310. The second data symbol has a value of –1 when sampled at point 312. The second data symbol is going through zero at point 306 while the first data symbol is being sampled and the first data symbol is going through zero at point 308 while the second data symbol is being sampled. Multiple delayed signals (echoes) or group delay caused by filters 122, especially diplexers, create problems near the band edges resulting in inter-symbol interference. Multiplicative impairments that are not illustrated herein, but well known to those skilled in the art, result in brief carrier drops of the signal that may be caused by connections becoming intermittent. In other cases, stray signals or energy may come into the channel of transmissions, which may not cause laser clipping, but distortion of the signal being transmitted. Data symbol voltages 310 or 312 will be affected by interference or distortion and will result in data symbol errors.

Hence, error correction works by putting additional information (2*t RS symbols) onto a code word of k RS symbols. The Cable Television Laboratories, Inc. standard DOCSIS 2.0 uses Reed-Solomon codes over a GF(256) with t=0 to 16. The codes have an ability to correct up to t erred RS symbols. However, if it is known in advance that a RS symbol is corrupt, 2*t RS symbols can be corrected in the DOCSIS standard using a process called erasure.

Figure 6:
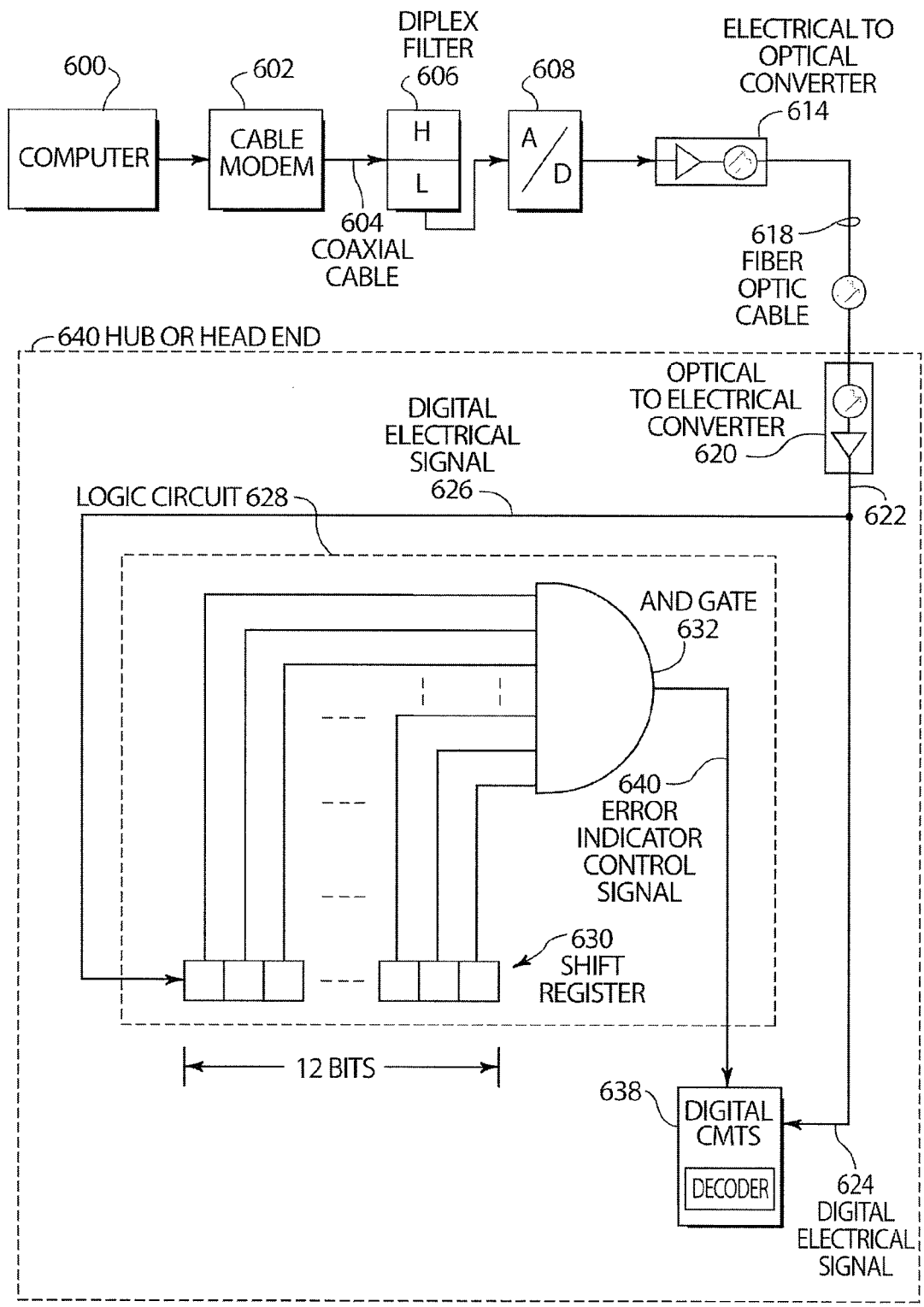
FIG. 6 illustrates an alternate embodiment of FIG. 4 for a logic circuit for detecting corrupt data symbols on a digital return of a cable television distribution network having a digital cable termination system.

The transmission process for an upstream DOCSIS transmission is specified in Cablelabs specification CM-SP-RFI2.0-110-051209, FIG. 6-2, and consists of the following steps: Input packet data stream, Block the data, RS encode using 8 bit RS symbols, Byte Interleave, Scramble, Preamble Prepend, data Symbol Map, Transmit Equalize, Filter, Modulate, and Output RF waveform bursts comprised of data symbols. The transmitted signal is a composite signal that includes linear block encoded symbols which are typically Reed-Solomon encoded symbols. Note that there are blocks of Reed-Solomon symbols, as illustrated in FIG. 3A, that should not be confused with the transmitted data symbols, as illustrated in FIG. 3B. Erasures are applied to the transmitted data symbols, and the marked transmitted data symbols are used to construct Reed-Solomon symbols that need erasure.

In the book entitled "Digital Communications, Fundamentals and Applications" by Bernard Sklar, The Aerospace Corporation, El Segundo, Calif. and University of California, Los Angeles, Section 5.5.5 discloses the principles of erasure correction, which states "that a receiver may be designed to declare a symbol erased when it is received ambiguously or when the receiver recognizes the presence of interference or a transient malfunction." The instant application teaches how corrupt signals are detected so that the principles of Reed-Solomon error correction and erasure can be implemented. Also, the inventive concepts of the use of erasure can be used with any error correction technique in which erasure of corrupt RS symbols increases the error correction capabilities of the error correction technique, especially linear block codes.

Figure 4:
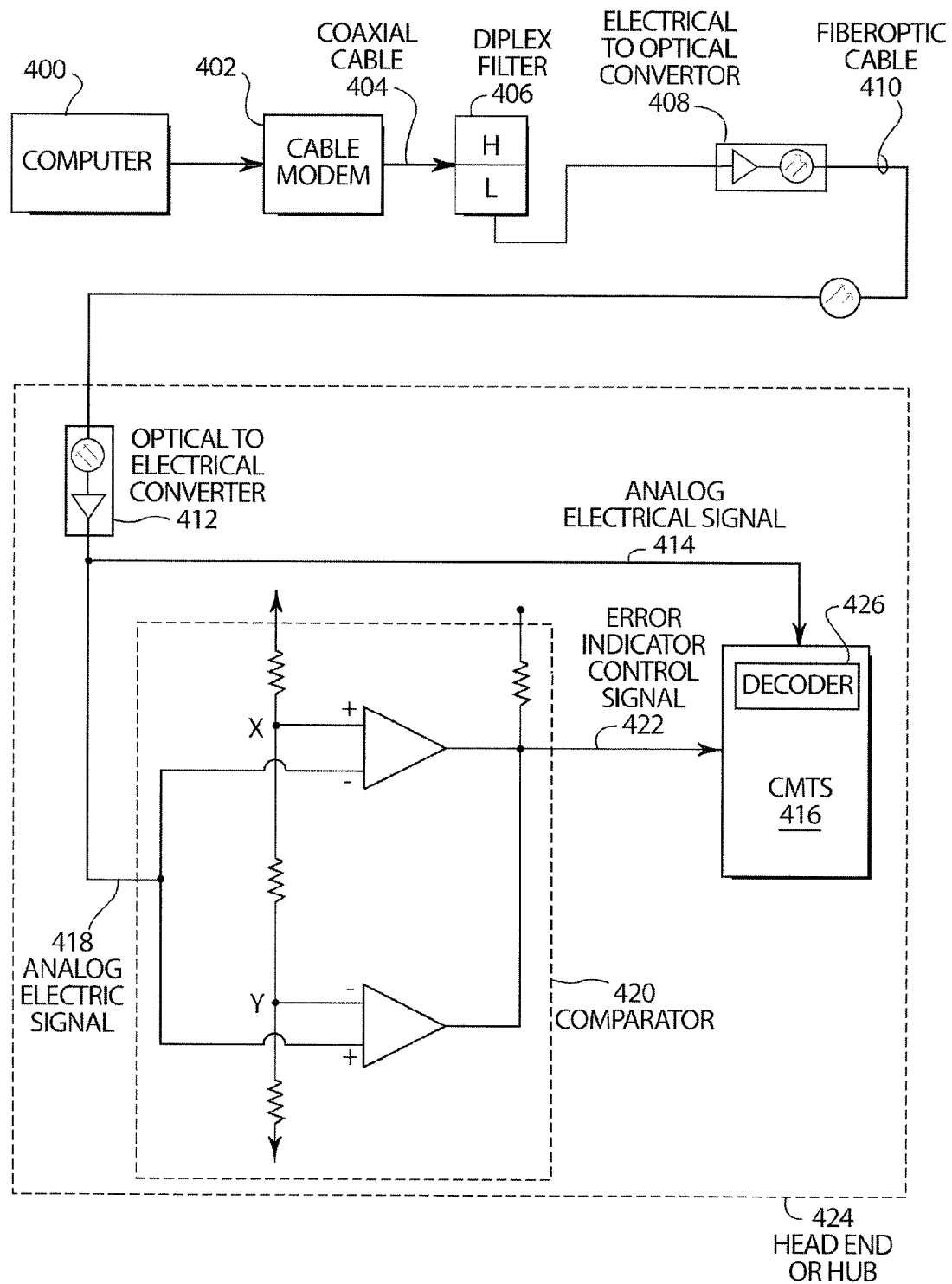
FIG. 4 illustrates a logic circuit for detecting corrupt data symbols on an analog laser return of a cable television distribution network having an analog termination system.
Figure 5:
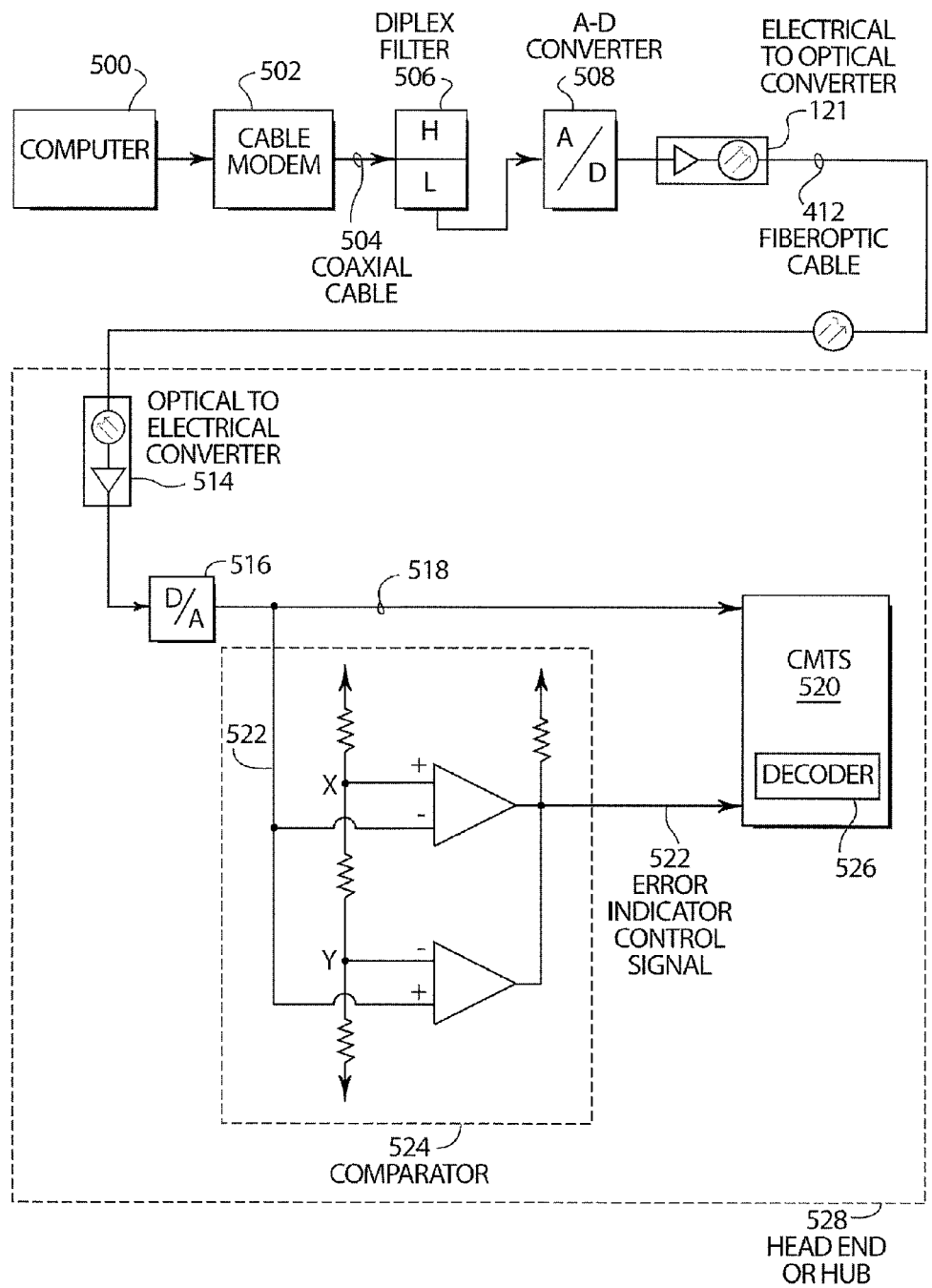
FIG. 5 illustrates a logic circuit for detecting corrupt data symbols on a digital return of a cable television distribution network having an analog termination system.

FIGS. 4 and 5 illustrate circuits for detecting corrupt data symbols. Digital upstream systems now commonly utilize analog to digital converters at nodes followed by digital transmission of the data back to the hub site or head end. A-D converters normally clip very abruptly. For example, on a 13 bit A-D converter, clipping can be indicated by a digital output "FFF" or "–FFF". Clipping or other errors caused by impulsive or burst noise almost certainly guarantees that any data symbol being received during the clipping is corrupt. Furthermore, clipping is very easily detected using digital logic. As disclosed herein, a detection circuit can be placed at a hub site or at the head end. When clipping or other errors are detected, corrupt RS symbols are erased, doubling the error correction ability of the code. A separate error indicator control signal that is applied to the CMTS can be used to indicate clipping or other data symbol errors, causing RS symbol erasures inside the CMTS.

FIG. 4 illustrates a logic circuit for detecting corrupt data symbols on an upstream analog return path of a cable television network having an analog termination at CMTS 416. A computer 400 is connected to a cable modem 402 for communication over a cable television distribution network via a coaxial cable 404. The cable modem 402 is connected to a diplex filter 406. The low output of the diplex filter 406 is fed to an electrical to optical converter 408 having a laser diode, which modulates a transmitted optical signal to a fiber optic cable 410 in the network. At the receiving end, either at the hub or the head end, an optical to electrical converter 412 uses a pin diode that converts the optical signal to an electrical signal. Line 414 transmits the analog electrical signal to the CMTS 416. The analog electrical signal is also transmitted over a parallel line 418 to a comparator circuit 420. Upper and lower limits X and Y are set in the comparator circuit 420, which correspond to the saturation and threshold levels of laser diode 408, respectively. If the saturation limit X is exceeded, clipping of the laser and other errors in the transmitted signal occur, including clipping in analog to digital converters. If the analog electrical signal does not meet the threshold current limit Y, further errors result. An output line 422 of the comparator circuit 420 generates an error indicator control signal 422 that is also applied to the CMTS that identifies data symbols on line 414 for erasure by CMTS 416 and decoder 426. The comparator circuit 420 and the CMTS 416 are typically located at the head end or hub 424. In other words, the comparator output 422 indicates when the analog electrical signal 418 has been clipped as a result of saturation or failure to meet the threshold current as a result of the analog electrical signal 418 exceeding the comparator voltage X or being less than the comparator voltage Y, or other forms of errors, as disclosed herein. The output 422 is a control signal that indicates a data symbol error that is applied to the CMTS 416 and decoder 426, indicating to the CMTS 416 and decoder 426 that the corresponding data symbol of the analog electrical signal that is transmitted to the CMTS 416 and decoder 426 on line 414, should be erased.

FIG. 5 illustrates a logic circuit for detecting corrupt data symbols on a digital upstream return path of a cable television network having a cable modem termination system. A computer or other device 500 is connected to a cable modem 502 for communication over the upstream path of a cable television network via a coaxial cable 504. The cable modem 502 is connected via coaxial cable 504 to a diplex filter 506. The output of the diplex filter 506 is connected to an analog to digital converter 508 that converts the analog signal from the diplex filter 506 to a digital signal. The output of the analog to digital converter 508 is fed to an electrical to optical converter 510 that uses a laser diode, which generates a modulated optical signal that is representative of the transmitted digital electrical signal from A/D converter 508. The digital optical signal that is generated by the laser diode is transmitted over fiber optic cable 512. At the receiving end, which is usually located either at the hub or at the head end, an optical to electrical converter 514 having a pin diode converts the optical signal to a digital electrical signal. The digital electrical signal is then applied to a digital to analog converter 516 that converts the digital electrical signal to an analog electrical signal. The output line 518 applies the electrical analog signal to the CMTS 520. A parallel line 522 applies the electrical analog signal to a comparator circuit 524. Upper and lower comparator voltages X and Y, that correspond to the saturation and threshold drive currents that are illustrated in FIG. 2 for the laser diode, are set in the comparator circuit 524 which indicates clipping of the laser, as well as other errors in the transmitted signal. An output of the comparator 526 generates an error indicator control signal 522 that is applied to the CMTS 520 and decoder 526 to identify data symbols for erasure in decoder 526. The comparator circuit 524 and the CMTS 520 may be located at the head end or hub 528.

FIG. 6 illustrates an alternative embodiment of FIG. 5 that uses a logic circuit 628 for detecting corrupt data symbols on a digital upstream return path of a cable television network system having a digital cable termination system. A computer 600 is connected to a cable modem 602 for communication over the upstream path of a cable television network via a coaxial cable 604. The cable modem 602 is connected via coaxial cable 604 to a diplex filter 606. The output of the diplex filter 606 is connected to an analog to digital converter 608. The analog to digital converter 608 converts the analog signal received from the diplex filter 606 to a digital signal. The digital signal is connected to an electrical to optical converter 614, which converts the electrical signal into a digital optical signal that is applied to a fiber optic cable 618. The fiber optic cable 618 transmits the signal to a hub or headend 640 that has an optical to electrical converter 620. Optical to electrical converter 620 generates an output 622 that is a digital electrical signal. The output 622 is split and applied to a logic circuit 628 via line 626. The output is also applied to the digital CMTS 638 via line 624. A logic circuit 628 includes a shift register 630. The serial bits from the output of A/D converter 608 are applied to shift register 630 as 12 bit samples. Each sample is loaded into the shift register. The 13$^{th}$ bit, which is a sign bit (either plus or minus) is ignored. The shift register 630 is tapped at each shift register location, as illustrated in FIG. 6. The AND gate 632 is attached to the twelve stages of the serial shift register 630. If each of the twelve bits in the twelve stages of the shift register 630 are ones, AND gate 632 generates a control signal output that is applied to the digital CMTS 638 and decoder 642. The output 640 of AND gate 632 is an error indicator control signal 640 that indicates the erasure of a corresponding digital electric signal (data symbol) that is transmitted to the digital CMTS 638 and decoder 642 via line 640. Since the sign signal is ignored both FFF and minus FFF are detected by AND gate 632 when the 12 bit signal (without a sign bit) is all 1's. In this manner, data symbols that are below the threshold level or above the saturation level of the analog to digital converter 608 are marked for erasure.

Figure 7:
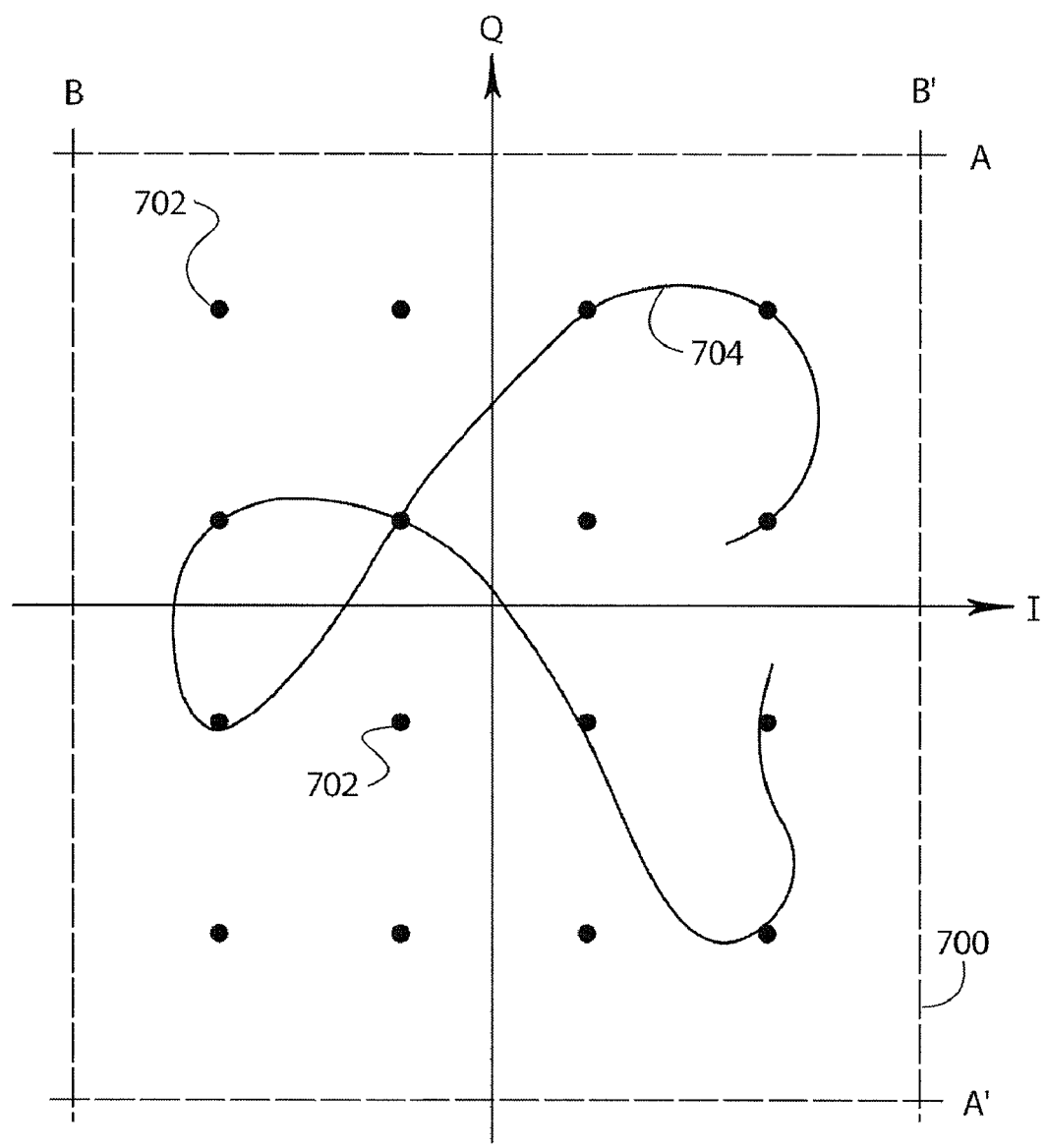
FIG. 7 is illustrates a block diagram of a vector diagram for determining if an in-band impairment is present.

FIG. 7 is a schematic of a vector diagram 700 for determining if an in-band impairment is present. A vector diagram consists of an in-phase (I) axis and a quadrature (Q) axis. As an example, 16 constellation points such as 702 are identified. An unimpaired 16-QAM signal 704 would pass randomly through one of these points at each data symbol period, as shown by a data symbol trajectory of the 16-QAM signal 704. If an impairment is present with energy in the received signal band, its effect would be to push the trajectory 704 off of the unimpaired path that is illustrated in FIG. 7. If the impairment is severe, it could push the signal trajectory across the left and right thresholds B and B', or across the upper and lower thresholds A and A'. When this occurs, an in-band impairment is present and the data symbol captured at that data symbol period should be marked for erasure.

Figure 8:
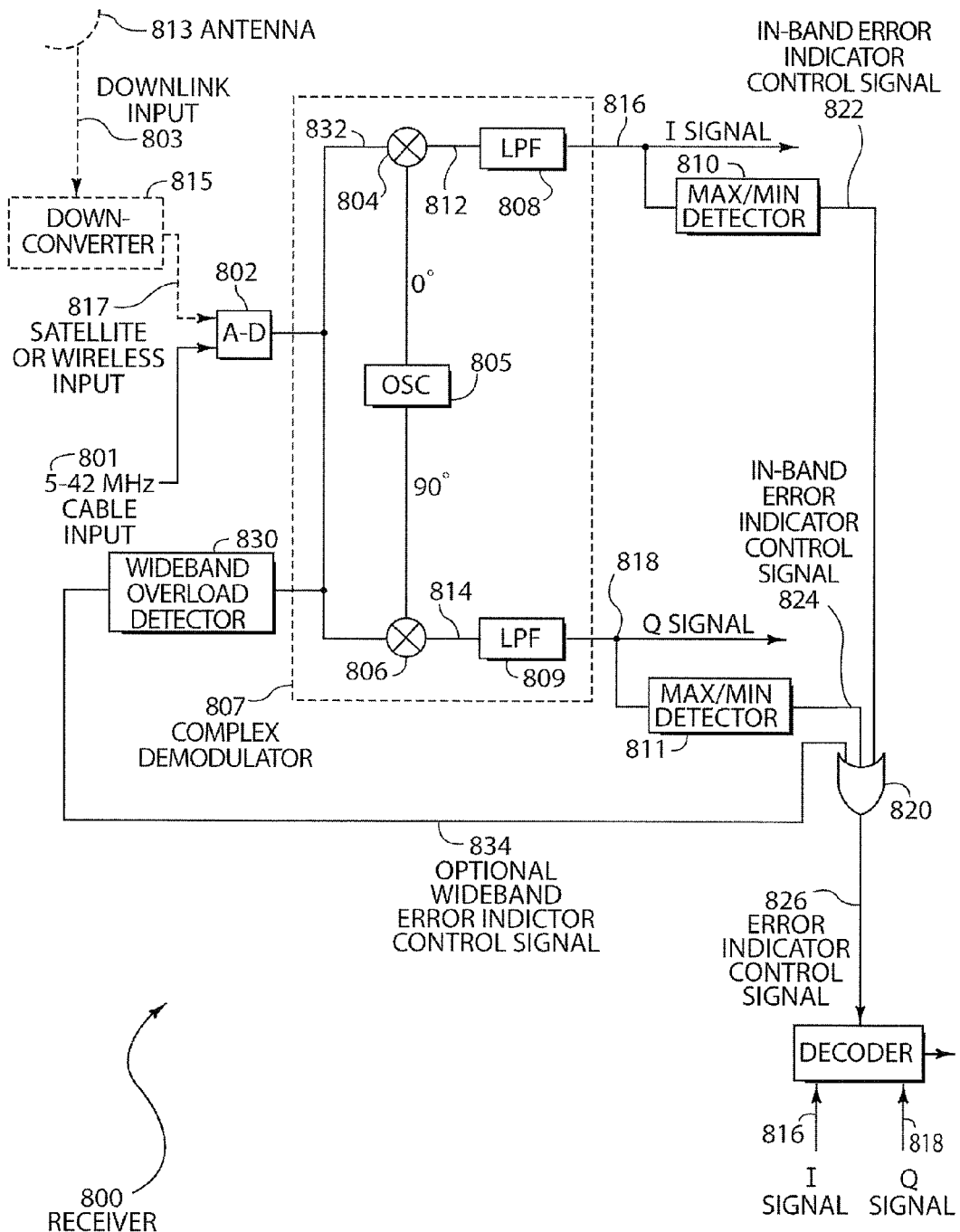
FIG. 8 is a block diagram of a detector for detecting an in-band impairment and optionally a wideband overload.

FIG. 8 is a block diagram of a CMTS receiver 800 that receives a cable input 801, or, alternatively, a satellite or wireless receiver that receives downlink input 803 from antenna 813 to a satellite headend or wireless receiver headend. The downconverter 815 downconverts the downlink input 803 to remove the carrier signal and produce a satellite or wireless input 817 that is applied to analog to digital converter 802. In this representative receiver, the full 5-42 MHz return signal 801, as well as the satellite wireless input 817, is digitized by an A-D converter 802. The digital output is mixed by a complex demodulator 807 comprised of an I mixer 804, a Q mixer 806 and a local oscillator 805. The I mixer is driven by the 0 degree port of the local oscillator 805, and the 90 degree port of the local oscillator 805 drives the Q mixer. The outputs 812, 814 of mixers 804, 806, respectively, are I and Q components of a baseband signal. Both I and Q components 812, 814 are low pass filtered by filters 808, 809, respectively, to eliminate out-of-band energy, i.e., energy that falls outside of the signal band of the intended signal. The two low pass filtered I and Q components 816, 818 are digitally compared by max/min detectors 810, 811, respectively, to determine if the signals 816, 818 are above or below thresholds A or A' and B or B'. If the data symbol that is currently being sampled is outside of the thresholds (limits), it will be marked for an erasure. The output of the minimum/maximum detectors 810, 811 are error indicator control signals 822, 824, respectively, that are applied to OR gate 820. OR gate 820 generates an error indicator control signal 826 when either error indicator control signal 822 or error indicator control signal 824 indicates an error. The error indicator control signal 826 is applied to the decoder 828. In addition, the I signal 816 and/or the Q signal 818 are also applied to the decoder 828. The error indicator control signal 826 marks the data symbols associated with the I signal 816 and the Q signal 818 for erasure if either the I signal 816 or the Q signal 818 exceeds the predetermined thresholds. Decoder 828 erases the symbols marked for erasure prior to decoding. By erasing the data symbols that are corrupt prior to decoding, the error correction capabilities of the decoder 828 are greatly increased, up to 2*t, rather than the 1*t error correction capabilities that are otherwise produced using Reed-Solomon error correction techniques. Also connected to the output bus of A-D 802 is an optional wideband overload detector 830. This digital logic circuit monitors the wideband signal level out of A-D 802 on bus 832. If the signal level on bus 832 goes above some predetermined maximum or below some predetermined minimum which correspond to laser clipping or saturation, an optional wideband error indicator control signal 834 goes active to indicate that an overload has occurred in the wideband signal. Thus, the OR gate 820 can produce an erasure on an in-band overload or on a wideband overload.

Of course, the structure for identifying in-band impairments and wideband overloads, as disclosed in FIG. 8, can be used in any receiving circuit that receives linear block encoded symbols for the purpose of identifying data symbols for erasure and increasing the error correction capabilities of any type of decoder for decoding the linear block code.

Hence, the embodiment of FIG. 8 is not limited to use with receivers in wireless transmission systems, such as satellite transmission systems and cable mobile termination systems, but any type of receiver to increase symbol corrections of the linear block codes. Hence, any type of system that uses a linear block code and error correction techniques for correcting symbol errors, can utilize the techniques disclosed with respect to the embodiment of FIG. 8.

Other applications for error erasure include the use of predictive technologies that can be applied to various receiver technology in which periodic impairments may occur. For example, a receiver circuit that is used in a CD or DVD player may use predictive techniques for erasure of data symbols that are impaired as a result of a scratch or an aperture on the surface of the CD or DVD. Data symbol errors as a result of scratches or holes on the disk can be detected with each rotation or spin of the disk and appear periodically in the data. The periodic nature of these impaired data symbols allows for the application of predictive techniques to identify data symbols in advance for erasure.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A receiver for receiving a data stream of data symbols that have been encoded with a linear block code, said receiver comprising:

a complex demodulator that demodulates said data symbols to produce an in-phase component and a quadrature phase component;

low pass filters that are connected to said demodulator that low pass filter said in-phase component and said quadrature phase component to remove out-of-band energy;

a comparator that compares said in-phase components and said quadrature phase components with predetermined thresholds that indicate in-band impairment of said data symbols and generate control signals that identify data symbols for erasure selected from the group consisting of data symbols that have: in-phase components that exceed said predetermined thresholds, and quadrature phase components that exceed said predetermined thresholds;

a wideband overload detector that detects if wideband energy of said data symbols exceeds a wideband energy limit and generates an additional control signal that identifies impaired data symbols that have wideband energy that exceeds said wideband energy limit;

a decoder that erases said data symbols that have been identified by said control signals and said additional control signals prior to decoding by said decoder so that the data correction capabilities of said decoder using Reed-Solomon error correction is increased up to t=(n−k), where t=number of corrections, k=number of data bits in a block of data and n=number of data bits plus redundancy bits in a block of data.

2. The receiver of claim 1 wherein said data stream comprises a data stream from a satellite transmission.

3. The receiver of claim 1 wherein said data stream comprises a DOCSIS compliant data stream from a cable transmission.

4. The receiver of claim 1 wherein said comparator comprises an analog comparator.

5. The receiver of claim 1 wherein said comparator comprises a digital logic comparator.

6. The receiver of claim 5 further comprising:
an analog to digital converter that converts said data stream to a digital data stream; and
said at least one limit is set by clipping levels of said analog to digital converter.

7. The receiver of claim 1 wherein said data stream is transmitted by lasers in an optical transmission line and said at least one predetermined threshold value is set by a threshold limit of said lasers.

8. The receiver of claim 1 wherein said data stream is transmitted by lasers in an optical transmission line and said at least one limit is set by a saturation limit of said lasers.

9. A method of increasing error correction capabilities of a receiver that receives a data stream of data symbols that have been encoded with a linear block code comprising:
demodulating said data stream of said data symbols to produce an in-phase component and a quadrature phase component;
low pass filtering said in-phase component and said quadrature phase component to eliminate out-of-band energy;
comparing said in-phase component with in-phase limits that indicate an in-band impairment of said in-phase component wherever said in-phase component exceeds said in-phase limits;
comparing said quadrature phase component with quadrature phase limits that indicate in-band impairment of said quadrature phase component wherever said quadrature phase component exceeds said quadrature phase limits;
generating a control signal that identifies corrupt data symbols for erasure, said corrupt data symbols selected from the group that consists of an in-phase component that exceeds said in-phase limits and a quadrature phase component that exceeds said quadrature phase limits;
erasing said corrupt data symbols that have been identified by said control signal;
detecting if wideband energy of said data symbols exceeds wideband energy limits using a wideband overload detector;
generating an additional control signal that identifies additional corrupt data symbols for erasure if said data symbols have wideband energy that exceeds said wideband energy limits;
erasing said additional corrupt data symbols identified by said additional control signal prior to decoding said data symbols identified by said additional control signal so as to increase data correction capabilities of said receiver;
decoding said data symbols after said corrupt data symbols and said corrupt data symbols have been erased, so that data correction capabilities of said receiver using Reed-Solomon error correction is increased up to $t=(n-k)$, where $t$=number of corrections, $k$=number of data bits in a block of said linear block code and $n$=number of data bits plus redundancy bits in said block of said linear block code.

10. The method of claim 9 wherein said data stream comprises a data stream from a satellite transmission.

11. The method of claim 9 wherein said data stream comprises a DOCSIS compliant data stream from a cable transmission.

12. The method of claim 9 wherein said process of comparing said in-phase component with said in-phase limits with quadrature phase limits comprises:
using an analog comparator to compare said in-phase component with said in-phase limits.

13. The method of claim 12 wherein said process of comparing said quadrature phase component with said quadrature phase limits comprises:
using an analog comparator to compare said quadrature phase component with said quadrature phase limits.

* * * * *